(12) United States Patent
Amada et al.

(10) Patent No.: US 12,098,450 B2
(45) Date of Patent: Sep. 24, 2024

(54) TRACKED UNDERCARRIAGE COMPONENT, AND METHOD FOR PRODUCING THE SAME

(71) Applicants: KOMATSU LTD., Tokyo (JP); NIPPON STEEL CORPORATION, Tokyo (JP)

(72) Inventors: Eiji Amada, Tokyo (JP); Kazuo Maeda, Tokyo (JP); Naomi Kobayashi, Tokyo (JP); Takashi Noda, Tokyo (JP); Mamoru Hatano, Tokyo (JP); Takafumi Amata, Tokyo (JP); Yutaka Neishi, Tokyo (JP); Kei Miyanishi, Tokyo (JP); Ryoji Nishijima, Tokyo (JP)

(73) Assignees: KOMATSU LTD., Tokyo (JP); NIPPON STEEL CORPORATION, Tokyo (JP)

( * ) Notice: Subject to any disclaimer, the term of this patent is extended or adjusted under 35 U.S.C. 154(b) by 801 days.

(21) Appl. No.: 17/271,024

(22) PCT Filed: Aug. 22, 2019

(86) PCT No.: PCT/JP2019/032890
§ 371 (c)(1),
(2) Date: Feb. 24, 2021

(87) PCT Pub. No.: WO2020/040263
PCT Pub. Date: Feb. 27, 2020

(65) Prior Publication Data
US 2021/0316801 A1    Oct. 14, 2021

(30) Foreign Application Priority Data

Aug. 24, 2018 (JP) .................................. 2018-157603

(51) Int. Cl.
*C22C 38/04* (2006.01)
*C21D 7/13* (2006.01)
(Continued)

(52) U.S. Cl.
CPC ................ *C22C 38/04* (2013.01); *C21D 7/13* (2013.01); *C21D 9/0087* (2013.01);
(Continued)

(58) Field of Classification Search
CPC .. B62D 55/21; B62D 55/20; C21D 2211/008; C21D 9/0087
See application file for complete search history.

(56) References Cited

U.S. PATENT DOCUMENTS

| 5,922,145 A | 7/1999 | Watari et al. |
| 2003/0026723 A1 | 2/2003 | Takayama et al. |

(Continued)

FOREIGN PATENT DOCUMENTS

| CN | 102312159 A | 1/2012 |
| CN | 104685088 A | 6/2015 |

(Continued)

OTHER PUBLICATIONS

Luo, Yuxiang; "Fundamentals of Engineering Materials and Mechanical Engineering"; Guangzhou Higher Education Publishing House; 2001.
(Continued)

*Primary Examiner* — Nicholas A Wang
(74) *Attorney, Agent, or Firm* — Oliff PLC

(57) ABSTRACT

A track link which is a tracked undercarriage component is made of a steel having a specific component composition, and includes a high hardness portion having a hardness of HRC 57 or more and HRC 60 or less, and a low hardness portion. The high hardness portion includes a first matrix including a martensite phase and a residual austenite phase,
(Continued)

and first nonmetallic particles dispersed in the first matrix and including at least one species selected from the group consisting of MnS, TiCN, and NbCN, and it does not include a $M_{23}C_6$ carbide. The low hardness portion includes a second matrix including a martensite phase, and second nonmetallic particles dispersed in the second matrix and including at least one species selected from the group consisting of MnS, TiCN, and NbCN, and it does not include a $M_{23}C_6$ carbide.

10 Claims, 6 Drawing Sheets

(51) Int. Cl.
*C21D 9/00* (2006.01)
*C22C 38/00* (2006.01)
*C22C 38/02* (2006.01)
*C22C 38/44* (2006.01)
*C22C 38/48* (2006.01)
*C22C 38/50* (2006.01)
*C22C 38/54* (2006.01)

(52) U.S. Cl.
CPC ............ *C22C 38/002* (2013.01); *C22C 38/02* (2013.01); *C22C 38/44* (2013.01); *C22C 38/48* (2013.01); *C22C 38/50* (2013.01); *C22C 38/54* (2013.01); *C21D 2211/008* (2013.01)

(56) References Cited

U.S. PATENT DOCUMENTS

| | | |
|---|---|---|
| 2004/0047757 A1 | 3/2004 | Takayama |
| 2011/0198002 A1 | 8/2011 | Nakagaito et al. |
| 2013/0133786 A1 | 5/2013 | Matsuda et al. |
| 2014/0127074 A1 | 5/2014 | Rosteck et al. |
| 2015/0037198 A1 | 2/2015 | Liu et al. |
| 2015/0232971 A1 | 8/2015 | Miura et al. |
| 2015/0361534 A1* | 12/2015 | Amada ................... C22C 38/44 305/201 |
| 2019/0119772 A1 | 4/2019 | Terazawa et al. |
| 2019/0309384 A1 | 10/2019 | Terazawa et al. |
| 2019/0316220 A1 | 10/2019 | Kondo et al. |
| 2021/0316801 A1 | 10/2021 | Amada et al. |
| 2022/0025475 A1 | 1/2022 | Amada et al. |

FOREIGN PATENT DOCUMENTS

| | | |
|---|---|---|
| CN | 108517472 A | 9/2018 |
| CN | 108642408 A | 10/2018 |
| CN | 108754329 A | 11/2018 |
| CN | 109072366 A | 12/2018 |
| CN | 109072368 A | 12/2018 |
| DE | 69718784 T2 | 12/2003 |
| DE | 10 2010 050 499 B3 | 1/2012 |
| EP | 2 003 221 A1 | 12/2008 |
| EP | 3 282 031 A1 | 2/2018 |
| JP | S61-166954 A | 7/1986 |
| JP | H08-041535 A | 2/1996 |
| JP | H10-8189 A | 1/1998 |
| JP | H10-140284 A | 5/1998 |
| JP | H11-229075 A | 8/1999 |
| JP | 2003-027181 A | 1/2003 |
| JP | 2003-328078 A | 11/2003 |
| JP | 2015-180771 A | 10/2015 |
| JP | 2016-079477 A | 5/2016 |
| JP | 2016-094636 A | 5/2016 |
| JP | 2018-103963 A | 7/2018 |
| WO | 2014/185337 A1 | 11/2014 |

OTHER PUBLICATIONS

"Hardness Comparison Table", Vickers hardness, Brinell hardness, Rockwell hardness and tensile strength Steel and cast steel, Group of companies Westfälische Stahlgesellschaft, 2014, pp. 1-2.
Apr. 11, 2024 Office Action issued in U.S. Appl. No. 17/311,886.
Amada et al.; U.S. Appl. No. 17/311,886, filed Jun. 8, 2021.

* cited by examiner

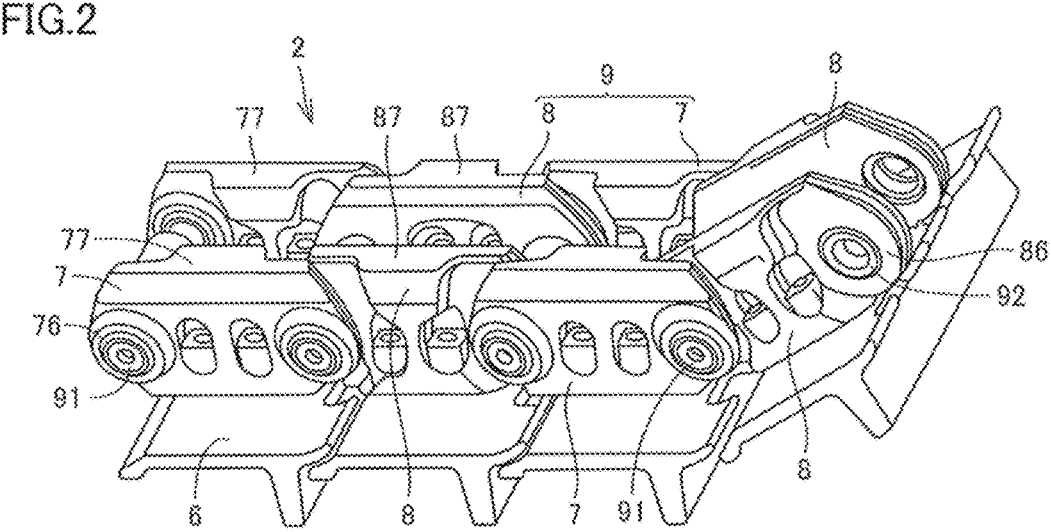

TRACKED UNDERCARRIAGE COMPONENT, AND METHOD FOR PRODUCING THE SAME

TECHNICAL FIELD

The present invention relates to a tracked undercarriage component, and a method for producing the same.

This application claims priority based on Japanese Patent Application No. 2018-157603 filed on Aug. 24, 2018, the entire contents of which are incorporated herein by reference.

BACKGROUND ART

Tracked undercarriage components, which are components constituting the undercarriage of track-type work machines such as hydraulic excavators and bulldozers, are used in the environment where they come into contact with sand and other hard objects. The tracked undercarriage components require high wear resistance for improved durability thereof. To improve the wear resistance, it is effective to increase the hardness of the components. Simply increasing the hardness of a component, however, will lead to reduction in toughness of the material constituting the component. The surface of the component may suffer cracking or peeling, giving rise to the need for replacement of the component. As such, in order to improve the durability of the tracked undercarriage components, it is necessary to maintain high crack resistance and high peel resistance while achieving high wear resistance.

As a steel for a tracked undercarriage component and a track link having excellent durability, a steel having a carbon content of about 0.4 mass % and various alloy elements added therein and a track link made of the steel have been proposed (see, for example, Japanese Translation of PCT International Publication No. 2014/185337 (Patent Literature 1)).

CITATION LIST

Patent Literature

Patent Literature 1: Japanese Translation of PCT International Publication No. 2014/185337

SUMMARY OF INVENTION

Technical Problem

When the steel disclosed in Patent Literature 1 is used to produce a tracked undercarriage component, the resultant component will have a sufficient hardness to achieve high wear resistance. A component produced using the steel disclosed in Patent Literature 1 through a common production process, however, tends to exhibit a small reduction of area in a tensile test. According to the investigations conducted by the present inventors, the smaller reduction of area in the tensile test leads to lower peer resistance. That is, a further improvement in durability is required for the tracked undercarriage component produced using the steel disclosed in Patent Literature 1 through a common production process.

One of the objects of the present invention is to provide a tracked undercarriage component excellent in durability and a method for producing the same.

Solution to Problem

A tracked undercarriage component according to the present invention is made of a steel containing not less than 0.41 mass % and not more than 0.44 mass % C, not less than 0.2 mass % and not more than 0.5 mass % Si, not less than 0.2 mass % and not more than 1.5 mass % Mn, not less than 0.0005 mass % and not more than 0.0050 mass % S, not less than 0.6 mass % and not more than 2.0 mass % Ni, not less than 0.7 mass % and not more than 1.5 mass % Cr, not less than 0.1 mass % and not more than 0.6 mass % Mo, not less than 0.02 mass % and not more than 0.03 mass % Nb, not less than 0.015 mass % and not more than 0.03 mass % Ti, not less than 0.0005 mass % and not more than 0.0030 mass % B, and not less than 20 mass ppm and not more than 60 mass ppm N, with the balance consisting of iron and unavoidable impurities. The tracked undercarriage component includes: a high hardness portion having a hardness of HRC 57 or more and HRC 60 or less; and a low hardness portion constituting a region other than the high hardness portion and having a lower hardness than the high hardness portion. The high hardness portion includes a first matrix including a martensite phase and a residual austenite phase, and first nonmetallic particles dispersed in the first matrix and including at least one species selected from the group consisting of MnS, TiCN, and NbCN, and the high hardness portion does not include a carbide represented as $M_{23}C_6$ (where M represents the metallic elements constituting the steel). The low hardness portion includes a second matrix including a martensite phase, and second nonmetallic particles dispersed in the second matrix and including at least one species selected from the group consisting of MnS, TiCN, and NbCN, and the low hardness portion does not include a carbide represented as $M_{23}C_6$ (where M represents the metallic elements constituting the steel).

A method for producing a tracked undercarriage component according to the present invention includes the steps of: preparing a steel material made of a steel containing not less than 0.41 mass % and not more than 0.44 mass % C, not less than 0.2 mass % and not more than 0.5 mass % Si, not less than 0.2 mass % and not more than 1.5 mass % Mn, not less than 0.0005 mass % and not more than 0.0050 mass % S, not less than 0.6 mass % and not more than 2.0 mass % Ni, not less than 0.7 mass % and not more than 1.5 mass % Cr, not less than 0.1 mass % and not more than 0.6 mass % Mo, not less than 0.02 mass % and not more than 0.03 mass % Nb, not less than 0.015 mass % and not more than 0.03 mass % Ti, not less than 0.0005 mass % and not more than 0.0030 mass % B, and not less than 20 mass ppm and not more than 60 mass ppm N, with the balance consisting of iron and unavoidable impurities; hot forging the steel material to obtain a formed body; performing quenching treatment on an entirety of the formed body by cooling the formed body from a temperature not lower than 945° C. and not higher than 1050° C. to a temperature not higher than the $M_s$ point of the steel and, thereafter, performing high temperature tempering treatment on the entirety of the formed body by heating the formed body to a temperature not lower than 570° C. and not higher than 620° C.; and forming a high hardness portion within the formed body by partially cooling the formed body having undergone the high temperature tempering treatment from a temperature not lower than 900° C. to a temperature not higher than the $M_s$ point of the steel and, thereafter, adjusting a hardness of the high hardness portion to be HRC 57 or more and HRC 60 or less by heating the high hardness portion to a temperature not lower than 150° C. and not higher than 200° C.

Effects of the Invention

According to the tracked undercarriage component and its producing method described above, it is possible to provide a tracked undercarriage component excellent in durability and a method for producing the same.

BRIEF DESCRIPTION OF DRAWINGS

FIG. 2 is a schematic perspective view showing a part of the structure of a track;

FIG. 3 is a schematic plan view showing a part of the structure of the track;

FIG. 4 is a schematic cross-sectional view taken along the line IV-IV in FIG. 3;

DESCRIPTION OF EMBODIMENT

Outline of Embodiment

Figure 1:
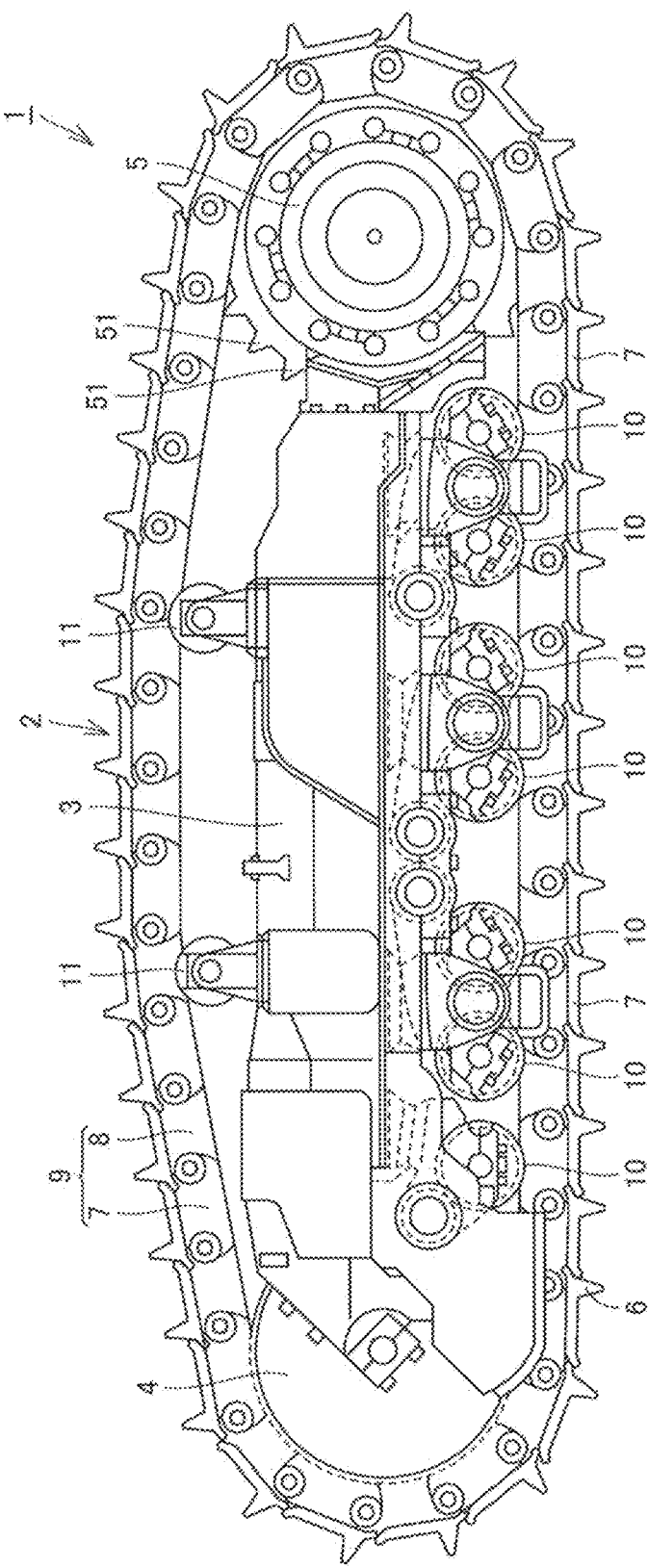
FIG. 1 is a schematic view showing the structure of a track travel device.

A tracked undercarriage component of the present application is made of a steel containing not less than 0.41 mass % and not more than 0.44 mass % C, not less than 0.2 mass % and not more than 0.5 mass % Si, not less than 0.2 mass % and not more than 1.5 mass % Mn, not less than 0.0005 mass % and not more than 0.0050 mass % S, not less than 0.6 mass % and not more than 2.0 mass % Ni, not less than 0.7 mass % and not more than 1.5 mass % Cr, not less than 0.1 mass % and not more than 0.6 mass % Mo, not less than 0.02 mass % and not more than 0.03 mass % Nb, not less than 0.015 mass % and not more than 0.03 mass % Ti, not less than 0.0005 mass % and not more than 0.0030 mass % B, and not less than 20 mass ppm and not more than 60 mass ppm N, with the balance consisting of iron and unavoidable impurities. The tracked undercarriage component includes: a high hardness portion having a hardness of HRC 57 or more and HRC 60 or less; and a low hardness portion constituting a region other than the high hardness portion and having a lower hardness than the high hardness portion. The high hardness portion includes a first matrix including a martensite phase and a residual austenite phase, and first nonmetallic particles dispersed in the first matrix and including at least one species selected from the group consisting of MnS, TiCN, and NbCN, and it does not include a carbide represented as $M_{23}C_6$ (where M represents the metallic elements constituting the steel). The low hardness portion includes a second matrix including a martensite phase, and second nonmetallic particles dispersed in the second matrix and including at least one species selected from the group consisting of MnS, TiCN, and NbCN, and it does not include a carbide represented as $M_{23}C_6$ (where M represents the metallic elements constituting the steel).

In the sand abrasion resistant component described above, the steel may further contain at least one species selected from the group consisting of not less than 0.05 mass % and not more than 0.20 mass % V, not less than 0.01 mass % and not more than 0.15 mass % Zr, and not less than 0.1 mass % and not more than 2.0 mass % Co.

Firstly, a description will be made about the reasons for limiting the component composition of the steel constituting the tracked undercarriage component of the present application to the above-described ranges.

Carbon (C): Not Less than 0.41 Mass % and not More than 0.44 Mass %

Carbon is an element that greatly affects the hardness of the steel. If the carbon content is less than 0.41 mass %, it will be difficult to obtain a hardness of HRC 57 or more with quenching and tempering. On the other hand, the carbon content exceeding 0.44 mass % will decrease the reduction of area and reduce the peel resistance. The carbon content is thus necessary to be within the above-described range. From the standpoint of readily securing a sufficient hardness, the carbon content is preferably 0.42 mass % or more.

Silicon (Si): Not Less than 0.2 Mass % and not More than 0.5 Mass %

Silicon is an element that has the effects of improving the hardenability of the steel, enhancing the matrix of the steel, and improving the resistance to temper softening, and also has a deoxidizing effect in the steelmaking process. If the silicon content is 0.2 mass % or less, the above effects cannot be obtained sufficiently. If the silicon content exceeds 0.5 mass %, however, the reduction of area tends to decrease. The silicon content is thus necessary to be within the above-described range.

Manganese (Mn): Not Less than 0.2 Mass % and not More than 1.5 Mass %

Manganese is an element effective in improving the hardenability of the steel, and also has a deoxidizing effect in the steelmaking process. If the manganese content is 0.2 mass % or less, the above effects cannot be obtained sufficiently. If the manganese content exceeds 1.5 mass %, however, the hardness before quench hardening will increase, leading to degradation in workability. From the standpoint of securing sufficient hardenability of the steel, the manganese content is preferably 0.40 mass % or more. Further, focusing on the workability, the manganese content is preferably 0.9 mass % or less, and more preferably 0.8 mass % or less.

Sulfur (S): Not Less than 0.0005 Mass % and not More than 0.0050 Mass %

Sulfur is an element that improves the machinability of the steel. Sulfur is also an element that is mixed during the steelmaking process even if not added intentionally. If the sulfur content is less than 0.0005 mass %, the machinability will decrease, and the production cost of the steel will increase. According to the investigations of the present inventors, in the component composition of the steel of the present application, the sulfur content greatly affects the reduction of area. If the sulfur content exceeds 0.0050 mass %, the reduction of area will decrease, making it difficult to obtain sufficient peel resistance. The sulfur content is thus necessary to be within the above-described range. The sulfur content of 0.0040 mass % or less can further improve the peel resistance.

Nickel (Ni): Not Less than 0.6 Mass % and not More than 2.0 Mass %

Nickel is an effective element in improving the toughness of the matrix of the steel. If the nickel content is less than 0.6 mass %, the above effect cannot be exerted sufficiently. If the nickel content exceeds 2.0 mass %, however, nickel becomes more likely to segregate in the steel. This may cause variation in the mechanical properties of the steel. The nickel content is thus necessary to be within the above-described range. Further, with the nickel content exceeding 1.5 mass %, the improvement in toughness will become moderate, and the production cost of the steel will increase. From these standpoints, the nickel content is preferably 1.5 mass % or less. On the other hand, in order to sufficiently exert the effect of improving the toughness of the steel matrix in the steel having a hardness of HRC 57 or more, the nickel content is preferably 1.0 mass % or more.

Chromium (Cr): Not Less than 0.7 Mass % and not More than 1.5 Mass %

Chromium improves the hardenability of the steel and also enhances the resistance to temper softening. In particular, chromium being added in combination with molybdenum, niobium, vanadium, and the like considerably enhances the resistance to temper softening of the steel. If the chromium content is less than 0.7 mass %, the above effects cannot be exerted sufficiently. If the chromium content exceeds 1.5 mass %, however, the improvement of the resistance to temper softening will become moderate, and the production cost of the steel will increase. The chromium content is thus necessary to be within the above-described range.

Molybdenum (Mo): Not Less than 0.1 Mass % and not More than 0.6 Mass %

Molybdenum improves the hardenability of the steel and enhances the resistance to temper softening. Molybdenum also has the function of improving the high temperature tempering brittleness. If the molybdenum content is less than 0.1 mass %, the above effects cannot be exerted sufficiently. If the molybdenum content exceeds 0.6 mass %, however, the above effects will be saturated. The molybdenum content is thus necessary to be within the above-described range.

Niobium (Nb): Not Less than 0.02 Mass % and not More than 0.03 Mass %

Niobium is effective in improving the strength and toughness of the steel. Particularly, niobium is a highly effective element in improving the toughness, as it makes the crystal grains of the steel extremely fine. In order to secure such effects, the niobium content should be 0.02 mass % or more. If the niobium content exceeds 0.03 mass %, however, coarse eutectic NbC will crystallize and the carbon content in the matrix will also decrease due to the formation of NbC in a large amount, leading to degradation in strength and toughness of the steel. Further, the niobium content exceeding 0.03 mass % will increase the production cost of the steel. The niobium content is thus necessary to be within the above-described range.

Titanium (Ti): Not Less than 0.015 Mass % and not More than 0.03 Mass %

Titanium is effective in improving the toughness of the steel. If the titanium content is less than 0.015 mass %, such an effect is small. If the titanium content exceeds 0.03 mass %, however, the toughness of the steel would rather deteriorate. The titanium content is thus necessary to be within the above-described range.

Boron (B): Not Less than 0.0005 Mass % and not More than 0.0030 Mass %

Boron is an element that considerably improves the hardenability of the steel. The addition of boron can decrease the addition amounts of the other elements added for the purpose of improving the hardenability, and can reduce the production cost of the steel. As compared to phosphorus (P) and sulfur, boron is more likely to segregate in the prior austenite grain boundary, and it particularly expels sulfur from the grain boundary, thereby improving the grain boundary strength. If the boron content is 0.0005 mass % or less, the above effects cannot be exerted sufficiently. If the boron content exceeds 0.0030 mass %, however, the added boron and nitrogen will combine to form BN, thereby deteriorating the toughness of the steel. The boron content is thus necessary to be within the above-described range.

Nitrogen (N): Not Less than 20 Mass ppm and not More than 60 Mass ppm

Nitrogen contained in an excessive amount may form excessive nitrides, leading to deteriorated toughness of the steel. The nitrogen content is thus necessary to be 60 mass ppm or less. The nitrogen content of less than 20 mass ppm, however, will increase the production cost of the steel. The nitrogen content is thus necessary to be within the above-described range.

Vanadium (V): Not Less than 0.05 Mass % and not More than 0.20 Mass %

Vanadium is not an indispensable element. Vanadium, however, forms fine carbides, contributing to production of finer crystal grains. If the vanadium content is less than 0.05 mass %, the above effect cannot be obtained sufficiently. If the vanadium content exceeds 0.20 mass %, however, the above effect will be saturated. Vanadium is a relatively expensive element, so it is preferably added in a minimum required amount. Thus, in the case of adding vanadium, the addition amount within the above-described range is appropriate.

Zirconium (Zr): Not Less than 0.01 Mass % and not More than 0.15 Mass %

Zirconium is not an indispensable element, but it has the effect of further improving the toughness of the steel by making carbides in the form of fine spherical particles dispersed in the steel. If the zirconium content is less than 0.01 mass %, its effect cannot be obtained sufficiently. If the zirconium content exceeds 0.15 mass %, however, the toughness of the steel would rather deteriorate. Thus, in the case of adding zirconium, the addition amount within the above-described range is appropriate.

Cobalt (Co): Not Less than 0.1 Mass % and not More than 2.0 Mass %

Cobalt is not an indispensable element, but it increases the solid solubility of chromium, molybdenum, and other carbide-forming elements to the matrix, and also improves the resistance to temper softening of the steel. The addition of cobalt thus achieves finer carbides and a higher tempering temperature, thereby improving the strength and toughness of the steel. If the cobalt content is less than 0.1 mass %, the above effects cannot be obtained sufficiently. On the other hand, because of its expensiveness, cobalt added in a large amount will increase the production cost of the steel. These problems become prominent with a cobalt content exceeding 2.0 mass %. Thus, in the case of adding cobalt, the addition amount within the above-described range is appropriate.

Unavoidable Impurities

Besides the components intentionally added during the production process, elements other than those described above may be mixed into the steel as unavoidable impurities. Phosphorus (P) as an unavoidable impurity is preferably contained in an amount of 0.010 mass % or less. Copper (Cu) as an unavoidable impurity is contained in an amount of preferably 0.1 mass % or less and more preferably 0.05 mass % or less. Aluminum (Al) as an unavoidable impurity is contained in an amount of preferably 0.04 mass % or less.

The tracked undercarriage component of the present application is made of the steel having the above-described appropriate component composition. Further, in the tracked undercarriage component of the present application, the high hardness portion and the low hardness portion do not include a carbide represented as $M_{23}C_6$ (where M represents the metallic elements constituting the steel, mainly at least one of Cr and Mo; hereinafter, referred to as "$M_{23}C_6$ carbide").

According to the investigations conducted by the present inventors, in the case of adopting the steel having the above-described appropriate component composition as the steel constituting a tracked undercarriage component, when the component is produced with a common production process, $M_{23}C_6$ carbides are generated at the grain boundaries of the steel. With the $M_{23}C_6$ carbides generated, the Cr and Mo contents decrease in the region around the $M_{23}C_6$ carbides. The hardenability in the region thus decreases, and a bainite structure is formed. The $M_{23}C_6$ carbides and the bainite structure formed attributable thereto decrease the reduction of area in the tensile test of the steel. A smaller reduction of area of the steel will reduce the peel resistance of the tracked undercarriage component made of the steel.

As a result of investigations of the way of improving the durability of the tracked undercarriage components, the present inventors have obtained findings that adopting the steel having the above-described appropriate component composition and eliminating the $M_{23}C_6$ carbides from the steel structure can improve the peel resistance and obtain a tracked undercarriage component excellent in durability. In the tracked undercarriage component of the present application, the steel having the above-described appropriate component composition is adopted as the steel constituting the tracked undercarriage component, and the high hardness portion and the low hardness portion include no $M_{23}C_6$ carbides. The tracked undercarriage component of the present application is thus a tracked undercarriage component excellent in durability.

In the present application, the state where the high hardness portion and the low hardness portion include no $M_{23}C_6$ carbides means a state where $M_{23}C_6$ carbides are not found when cross sections of the high hardness portion and the low hardness portion are observed using a field-emission scanning electron microscope (FE-SEM) and an area of 80 $\mu m^2$ including the grain boundary of the steel is examined for 10 or more fields of view. The $M_{23}C_6$ carbide can be identified, when a possible product of $M_{23}C_6$ carbide is found for example in the above-described manner, by detecting the product in a bright-field image of a scanning transmission electron microscope (STEM) and then confirming the selected area diffraction (SAD) pattern of the product.

In the tracked undercarriage component described above, the first matrix may have a grain size number of 5 or more and 12 or less. The second matrix may have a grain size number of 5 or more and 9 or less. With this configuration, excellent toughness can readily be imparted to the tracked undercarriage component. The grain size number of the first matrix is preferably 9 or more and 12 or less. The grain size number of the second matrix is preferably 7 or more and 9 or less.

In the tracked undercarriage component described above, the martensite phase constituting the first matrix may be a low temperature-tempered martensite phase. The martensite phase constituting the second matrix may be a high temperature-tempered martensite phase (sorbite phase). With this configuration, excellent toughness can readily be imparted to the tracked undercarriage component.

As used herein, the low temperature-tempered martensite phase means a phase made up of a structure (obtained through low temperature tempering) which is obtained when a steel that has been quenched is tempered at a temperature not lower than 150° C. and not higher than 250° C. The high temperature-tempered martensite phase means a phase made up of a structure (obtained through high temperature tempering) which is obtained when a quenched steel is tempered at a temperature of 500° C. or higher. The phase being the low temperature-tempered martensite phase and the phase being the high temperature-tempered martensite phase can be confirmed through investigation of the hardness, carbide precipitation state, etc. of the respective phases.

A method for producing a tracked undercarriage component of the present application includes the steps of: preparing a steel material made of a steel containing not less than 0.41 mass % and not more than 0.44 mass % C, not less than 0.2 mass % and not more than 0.5 mass % Si, not less than 0.2 mass % and not more than 1.5 mass % Mn, not less than 0.0005 mass % and not more than 0.0050 mass % S, not less than 0.6 mass % and not more than 2.0 mass % Ni, not less than 0.7 mass % and not more than 1.5 mass % Cr, not less than 0.1 mass % and not more than 0.6 mass % Mo, not less than 0.02 mass % and not more than 0.03 mass % Nb, not less than 0.015 mass % and not more than 0.03 mass % Ti, not less than 0.0005 mass % and not more than 0.0030 mass % B, and not less than 20 mass ppm and not more than 60 mass ppm N, with the balance consisting of iron and unavoidable impurities; hot forging the steel material to obtain a formed body; performing quenching treatment on an entirety of the formed body by cooling the formed body from a temperature not lower than 945° C. and not higher than 1050° C. to a temperature not higher than the $M_s$ point of the steel and, thereafter, performing high temperature tempering treatment on the entirety of the formed body by heating the formed body to a temperature not lower than 570° C. and not higher than 620° C.; and forming a high hardness portion within the formed body by partially cooling the formed body having undergone the high temperature tempering treatment from a temperature not lower than 900° C. to a temperature not higher than the $M_s$ point of the steel and, thereafter, adjusting a hardness of the high hardness portion to be HRC 57 or more and HRC 60 or less by heating the high hardness portion to a temperature not lower than 150° C. and not higher than 200° C.

In the tracked undercarriage component producing method described above, the steel may further contain at least one species selected from the group consisting of not less than 0.05 mass % and not more than 0.20 mass % V, not less than 0.01 mass % and not more than 0.15 mass % Zr, and not less than 0.1 mass % and not more than 2.0 mass % Co.

In the tracked undercarriage component producing method of the present application, after a steel material made of the steel having the above-described appropriate component composition is prepared, the steel material is hot forged to obtain a formed body. In the cooling process following the heating of the hot forging, $M_{23}C_6$ carbides are generated at the grain boundaries of the steel. Thereafter, in the tracked undercarriage component producing method of the present application, quenching treatment is performed on the entirety of the formed body by cooling the formed body from a temperature not lower than 945° C. and not higher than 1050° C. to a temperature not higher than the $M_s$ point of the steel, and then high temperature tempering treatment is performed on the entirety of the formed body by heating the formed body to a temperature not lower than 570° C. and not higher than 620° C. With the heating temperature for the quenching treatment being set to be 945° C. or higher, the $M_{23}C_6$ carbides previously generated dissolve into the matrix of the steel and disappear. Thereafter, a high hardness portion is formed, and then the hardness of the high hardness portion is adjusted to be HRC 57 or more and HRC 60 or less by heating the high hardness portion to a temperature not lower than 150° C. and not higher than 200° C. A region of the formed body other than the region where the high hardness portion has been formed becomes a low hardness portion. In this manner, it is readily possible to produce the tracked undercarriage component of the present application that includes the high hardness portion and the low hardness portion both including no $M_{23}C_6$ carbides.

Specific Example of Embodiment

An embodiment of the tracked undercarriage component of the present invention will be described below with reference to the drawings. In the following drawings, the same or corresponding parts are denoted by the same reference numerals, and the description thereof will not be repeated.

Firstly, referring to FIGS. 1 to 4, a track link as a tracked undercarriage component in the present embodiment will be described. FIG. 1 is a schematic view showing the structure of a track travel device. FIG. 2 is a schematic perspective view showing a part of the structure of a track. FIG. 3 is a schematic plan view showing a part of the structure of the track. FIG. 4 is a schematic cross-sectional view taken along the line IV-IV in FIG. 3.

Referring to FIG. 1, a track travel device 1 in the present embodiment is a travel device for a work machine such as a bulldozer. The track travel device 1 includes a track 2, a track frame 3, an idler tumbler 4, a sprocket wheel 5, a plurality of (here, seven) track rollers 10, and a plurality of (here, two) carrier rollers 11.

The track 2 includes a plurality of track links 9, which are connected annularly (endlessly), and track shoes 6, which are secured to the corresponding track links 9. The track links 9 include outer links 7 and inner links 8. The outer links 7 and the inner links 8 are connected alternately. Referring to FIGS. 2 and 3, each track shoe 6 is fixed to track shoe securing surfaces 79, 89 of a pair of outer links 7 or a pair of inner links 8. This forms two rows of links each made up of the alternately arranged outer links 7 and inner links 8.

Referring to FIG. 1, the idler tumbler 4, the plurality of (here, seven) track rollers 10, and the plurality of (here, two) carrier rollers 11 are attached to the track frame 3 in such a manner that they are rotatable about their respective axes. As viewed from the center of the track frame 3, the sprocket wheel 5 is disposed on its one end opposite to the end where the idler tumbler 4 is attached. A power source such as an engine is connected to the sprocket wheel 5, and the sprocket wheel 5, being driven by the power source, rotates about its axis. On an outer peripheral surface of the sprocket wheel 5, a plurality of sprocket teeth 51 are arranged, which are projections protruding radially outward. Each sprocket tooth 51 is engaged with the track 2, causing the rotation of the sprocket wheel 5 to be transmitted to the track 2. As a result, the track 2 rotates in a circumferential direction, being driven by the rotation of the sprocket wheel 5.

The idler tumbler 4 is attached to the end (opposite to the end where the sprocket wheel 5 is disposed) of the track frame 3. The track rollers 10 and the carrier rollers 11 are attached to the track frame 3 in the region sandwiched between the sprocket wheel 5 and the idler tumbler 4, on the ground contact side and on the side opposite to the ground contact side, respectively. The idler tumbler 4, the track rollers 10, and the carrier rollers 11 have their outer peripheral surfaces coming into contact with the inner peripheral surface of the track 2. As a result, the track 2, driven by the rotation of the sprocket wheel 5, rotates in the circumferential direction while being guided by the idler tumbler 4, the sprocket wheel 5, the track rollers 10, and the carrier rollers 11.

The structure of the track 2 will now be described in detail. Referring to FIGS. 2 and 3, each track shoe 6 is fastened and secured to the outer links 7 or the inner links 8 by bolts 93 and nuts 94. An outer link 7 and an inner link 8 adjacent to each other are arranged such that they partially overlap each other as seen from the direction perpendicular to the rotational plane of the track 2 (as seen in the viewpoint of FIG. 3), and they are connected using a connecting pin 91 and a bushing 92.

More specifically, referring to FIGS. 2 to 4, each inner link 8 has two bushing holes 85 formed to penetrate in the direction perpendicular to the rotational plane of the track 2. Of these two bushing holes 85, one bushing hole 85 is formed at one end in the longitudinal direction of the inner link 8, and the other bushing hole 85 is formed at the other end thereof. Further, the inner link 8 has a rail surface 87 formed on its side opposite to the side on which the track shoe 6 is attached. Each outer link 7 has two connecting pin holes 75 formed to penetrate in the direction perpendicular to the rotational plane of the track 2. Of these two connecting pin holes 75, one connecting pin hole 75 is formed at one end in the longitudinal direction of the outer link 7, and the other connecting pin hole 75 is formed at the other end thereof. Further, the outer link 7 has a rail surface 77 formed on its side opposite to the side on which the track shoe 6 is attached.

A pair of outer links 7 to which a track shoe 6 is secured are arranged in such a manner that their two connecting pin holes 75 are aligned respectively as seen from the direction perpendicular to the rotational plane of the track 2. Similarly, a pair of inner links 8 to which a track shoe 6 is secured are arranged in such a manner that their two bushing holes 85 are aligned respectively as seen from the direction perpendicular to the rotational plane of the track 2. Further, the outer links 7 and the inner links 8 adjacent to each other are arranged in such a manner that the connecting pin holes 75 and the bushing holes 85 are aligned as seen from the direction perpendicular to the rotational plane of the track 2. Then, referring to FIG. 4, a connecting pin 91 is disposed in such a way as to penetrate through the connecting pin hole 75 of the outer link 7 belonging to one row, the bushing hole 85 of the inner link 8 belonging to the one row, the bushing hole 85 of the inner link 8 belonging to the other row, and the connecting pin hole 75 of the outer link 7 belonging to the other row. The connecting pin 91 is press-fitted into the connecting pin holes 75, and its respective ends are caulked at bosses 76 of the corresponding outer links 7 so as to be fixedly secured to the pair of the outer links 7.

Referring to FIG. 4, a bushing 92 includes a pair of fixed bushings 92B and a rotatable bushing 92A arranged between the pair of fixed bushings 92B. The rotatable bushing 92A and the pair of fixed bushings 92B are of hollow cylindrical shape having through holes in the regions including their axes. The rotatable bushing 92A and the pair of fixed bushings 92B are arranged coaxially. A seal ring 95 is arranged between the rotatable bushing 92A and the fixed bushing 92B. The fixed bushing 92B is fixedly secured as it is fitted into the bushing hole 85 of the inner link 8. The connecting pin 91 is disposed to penetrate through the through holes of the rotatable bushing 92A and the pair of fixed bushings 92B. This allows the rotatable bushing 92A to rotate in the circumferential direction relative to the connecting pin 91.

Further, referring to FIG. 4, the connecting pin 91 has a lubricant reservoir 91A, formed to extend in the axial direction in the region including the axis of the pin, for storing a lubricant such as lubricating oil. The connecting pin 91 also has a lubricant passage 91B, formed to extend in the radial direction, for communication between the outer peripheral surface and the lubricant reservoir 91A. The lubricant reservoir 91A has an opening on one end face of the connecting pin 91, and a plug 91C is fitted into the opening. The lubricant such as lubricating oil is supplied from the opening of the lubricant reservoir 91A into the lubricant reservoir 91A and, with the plug 91C fitted into the opening, stored in the lubricant reservoir 91A. The lubricant inside the lubricant reservoir 91A is supplied via the lubricant passage 91B to between the outer peripheral surface of the connecting pin 91 and the inner peripheral surface of the rotatable bushing 92A. This alleviates the friction between the outer peripheral surface of the connecting pin 91 and the inner peripheral surface of the rotatable bushing 92A, and suppresses the wear on the outer peripheral surface of the connecting pin 91 and the inner peripheral surface of the rotatable bushing 92A. That is, the track 2 is a rotatable bushing type track having the above-described structure including the rotatable bushing 92A. In such a track travel device 1, the wear on the rail surface 77 of the outer link 7 or the rail surface 87 of the inner link often determines the life of the track travel device 1 or the component replacement period.

In the track travel device 1 in the present embodiment, the track links 9 (outer links 7 and inner links 8) as the tracked undercarriage components are made of a steel that contains not less than 0.41 mass % and not more than 0.44 mass % C, not less than 0.2 mass % and not more than 0.5 mass % Si, not less than 0.2 mass % and not more than 1.5 mass % Mn, not less than 0.0005 mass % and not more than 0.0050 mass % S, not less than 0.6 mass % and not more than 2.0 mass % Ni, not less than 0.7 mass % and not more than 1.5 mass % Cr, not less than 0.1 mass % and not more than 0.6 mass % Mo, not less than 0.02 mass % and not more than 0.03 mass % Nb, not less than 0.015 mass % and not more than 0.03 mass % Ti, not less than 0.0005 mass % and not more than 0.0030 mass % B, and not less than 20 mass ppm and not more than 60 mass ppm N, with the balance consisting of iron and unavoidable impurities. A region of a track link 9 including the rail surface 77, 87 corresponds to the high hardness portion 7A, 8A having a hardness of HRC 57 or more and HRC 60 or less. The high hardness portion 7A, 8A is a hardened layer which is formed, for example, by being partially subjected to quench hardening treatment. Such partial quench hardening treatment can be performed by induction hardening, for example. The region of the track link 9 other than the high hardness portion 7A, 8A is the low hardness portion 7B, 8B which is lower in hardness than the high hardness portion 7A, 8A. The low hardness portion 7B, 8B has a hardness of, for example, HRC 30 or more and HRC 45 or less.

The high hardness portion 7A, 8B includes a first matrix including a martensite phase and a residual austenite phase, and first nonmetallic particles dispersed in the first matrix and including at least one species selected from the group consisting of MnS, TiCN, and NbCN, and it does not include a $M_{23}C_6$ carbide. The amount of residual austenite included in the high hardness portion 7A, 8A is 10 vol % or less, for example. The amount of residual austenite included in the high hardness portion 7A, 8A is preferably 5 vol % or less, or 4 vol % or less, or still more preferably 3 vol % or less. The low hardness portion 7B, 8B includes a second matrix including a martensite phase, and second nonmetallic particles dispersed in the second matrix and including at least one species selected from the group consisting of MnS, TiCN, and NbCN, and it does not include a $M_{23}C_6$ carbide.

The steel constituting the track link 9 may further contain at least one species selected from the group consisting of not less than 0.05 mass % and not more than 0.20 mass % V, not less than 0.01 mass % and not more than 0.15 mass % Zr, and not less than 0.1 mass % and not more than 2.0 mass % Co.

The track link 9 as the tracked undercarriage component of the present embodiment adopts the steel having the above-described appropriate component composition as the material, and the high hardness portion 7A, 8A and the low hardness portion 7B, 8B do not include a $M_{23}C_6$ carbide. Accordingly, the track link 9 as the tracked undercarriage component of the present embodiment is a tracked undercarriage component excellent in durability.

In the track link 9, the first matrix constituting the high hardness portion 7A, 8A has a grain size number of preferably 5 or more and 12 or less and more preferably 9 or more and 12 or less. The second matrix constituting the low hardness portion 7B, 8B has a grain size number of preferably 5 or more and 9 or less and more preferably 7 or more and 9 or less. With this configuration, excellent toughness can readily be imparted to the track link 9.

In the track link 9, the martensite phase constituting the first matrix is preferably a low temperature-tempered martensite phase. The martensite phase constituting the second matrix is preferably a high temperature-tempered martensite phase. With this configuration, excellent toughness can readily be imparted to the track link 9.

Figure 5:
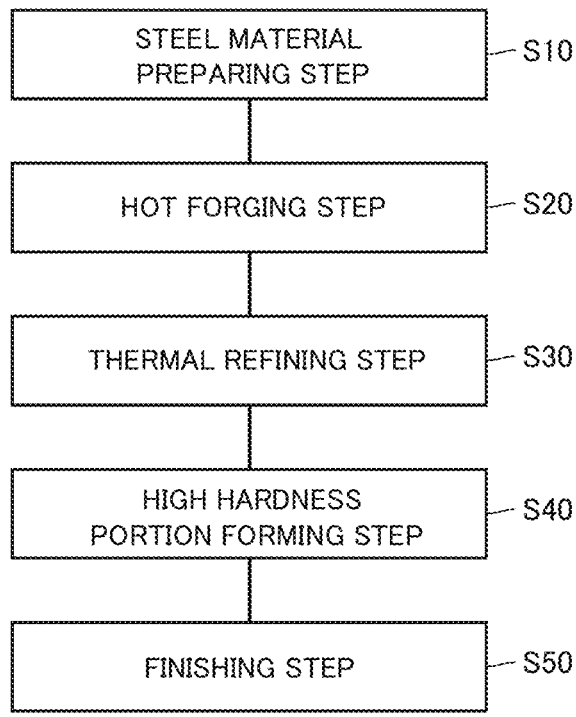
FIG. 5 is a flowchart schematically illustrating the steps for producing a track link.

An exemplary method of producing a track link 9 as the tracked undercarriage component of the present embodiment will now be described with reference to FIG. 5. In the method of producing the track link 9 in the present embodiment, firstly, a steel material preparing step is performed as a step S10. In the step S10, a steel material made of the steel having the above-described appropriate component composition is prepared.

Next, a hot forging step is performed as a step S20. In the step S20, the steel material prepared in the step S10 is subjected to hot forging. With this, a formed body having a schematic shape of the track link 9 is obtained. Hot forging is performed by, for example, heating the steel material prepared in the step S10 to a temperature not lower than 1200° C., e.g. to 1250° C. In the cooling process following the hot forging, $M_{23}C_6$ carbides are formed at the grain boundaries of the steel.

Next, a thermal refining step is performed as a step S30. In the step S30, the formed body obtained in the step S20 is subjected to thermal refining treatment. Specifically, the formed body is firstly heated to a temperature range of not lower than 945° C. and not higher than 1050° C., and then cooled from the temperature range to a temperature not higher than the $M_s$ point of the steel. In this manner, the entirety of the formed body is quenched. Next, the formed body thus quenched is heated to a temperature range of not lower than 570° C. and not higher than 620° C., and then cooled to a room temperature. In this manner, the entirety of the formed body is tempered at high temperature. With this, the matrix of the steel constituting the formed body attains a high temperature-tempered martensite phase over the entire area. Here, setting the heating temperature for the quenching treatment in the temperature range of 945° C. or higher and 1050° C. or lower, being higher than a typical heating temperature, causes the $M_{23}C_6$ carbides generated in the step S20 to dissolve into the matrix of the steel and disappear.

Next, a high hardness portion forming step is performed as a step S40. In the step S40, of the formed body having undergone the thermal refining treatment in the step S30, a region where the high hardness portion 7A, 8A is to be formed is firstly heated to a temperature range of not lower than 900° C., and then cooled from the temperature range to a temperature not higher than the $M_s$ point of the steel. In this manner, the high hardness portion 7A, 8A is formed in the formed body. The partial heating of the formed body can be performed, for example, by induction heating. The cooling to the temperature not higher than the $M_s$ point of the steel can be performed, for example, by cooling adopting water or a solution of soluble oil as a cooling medium. The cooling is preferably continued until the surface temperature of the formed body becomes a temperature not higher than 100° C. The cooling is continued until, for example, the surface temperature of the formed body becomes a temperature not lower than 50° C. and not higher than 100° C. Thereafter, the high hardness portion 7A, 8A is heated to a temperature range of not lower than 150° C. and not higher than 200° C. and then cooled to a room temperature (low temperature tempering). With this, the hardness of the steel constituting the high hardness portion 7A, 8A is adjusted to a range of HRC 57 or more and HRC 60 or less.

Next, a finishing step is performed as a step S50 as required. In the step S50, the formed body obtained through the steps S10 to S40 is subjected to any necessary finishing or other treatment. The track link 9 in the present embodiment can be produced through the above-described process.

According to the method for producing a track link of the present embodiment, the $M_{23}C_6$ carbides that are generated, during forming by hot forging the steel material made of the steel having the above-described appropriate component composition, along the grain boundaries of the steel are made to disappear by increasing the heating temperature in the quenching treatment in the step S30 to 945° C. or higher, before the formation of the high hardness portion 7A, 8A. In this manner, the track link 9 as the tracked undercarriage component excellent in durability can be produced.

Examples

Samples corresponding to the high hardness portion and the low hardness portion of the tracked undercarriage component of the present application were prepared using steel materials made of steels having the above-described appropriate component composition, and experiments for evaluating their properties were conducted. The experimental procedures were as follows.

Firstly, steel materials A to C, made of the steels having the above-described appropriate component composition, were prepared. Specific component compositions are shown in Table 1. The values in Table 1 are in mass %.

TABLE 1

|   | C | Si | Mn | P | S | Ni | Cr | Mo | Nb | Ti | Al | B | N | Fe |
|---|---|---|---|---|---|---|---|---|---|---|---|---|---|---|
| A | 0.42 | 0.30 | 0.40 | 0.008 | 0.005 | 1.26 | 0.98 | 0.49 | 0.027 | 0.019 | 0.039 | 0.0024 | 0.0041 | Bal. |
| B | 0.43 | 0.30 | 0.40 | 0.008 | 0.004 | 1.29 | 0.99 | 0.48 | 0.029 | 0.024 | 0.033 | 0.0024 | 0.0035 | Bal. |
| C | 0.44 | 0.29 | 0.40 | 0.008 | 0.005 | 1.31 | 0.99 | 0.48 | 0.029 | 0.020 | 0.040 | 0.0026 | 0.0037 | Bal. |

(Experiments on Mechanical Properties)

Of the steel materials shown in Table 1, the steel material C was used to prepare samples corresponding to the high hardness portion through a process similar to the steps S10 to S40 in the above embodiment. From the obtained samples, a tensile test specimen and a Charpy impact test specimen (2 mm U-notch) were produced and subjected to a tensile test and an impact test. Further, the amount of residual austenite in the sample obtained in the similar manner was measured. A test specimen for observation was produced from the sample obtained in the similar manner, and the ASTM grain size was confirmed (Inventive Example). For comparison, the steel material B was used to prepare samples through a process of the steps S10 to S40 in the above embodiment, during which the heating temperature upon quenching in the step S40 was set to be lower than 900° C. The samples were subjected to the similar tests (Comparative Example). The heating temperature and cooling temperature upon quenching, as well as the test results are shown in Table 2. For the Comparative Example 1, the residual austenite amount was not measured.

TABLE 2

|   | Heating Temperature (° C.) | Cooling Temperature (° C.) | 0.2% Proof Stress (MPa) | Tensile Strength (MPa) | Elongation (%) | Reduction of Area (%) | Impact Value (J/cm²) | Residual Austenite Amount (vol %) | Grain Size (ASTM No.) |
|---|---|---|---|---|---|---|---|---|---|
| Inventive Example | 940 | 60 | 1588 | 2183 | 15 | 43 | 68 | 1.2 | 10 |

TABLE 2-continued

| | Heating Temperature (° C.) | Cooling Temperature (° C.) | 0.2% Proof Stress (MPa) | Tensile Strength (MPa) | Elongation (%) | Reduction of Area (%) | Impact Value (J/cm$^2$) | Residual Austenite Amount (vol %) | Grain Size (ASTM No.) |
|---|---|---|---|---|---|---|---|---|---|
| Comparative Example | 880 | 48 | 1606 | 2058 | 14 | 44 | 71 | — | 11 |

Of the steel materials in Table 1, the steel material A was used to prepare samples corresponding to the low hardness portion through a process similar to the steps S10 to S30 in the above embodiment. From the obtained samples, a tensile test specimen and a Charpy impact test specimen (2 mm U-notch) were produced and subjected to the tensile test and the impact test. A test specimen for observation was produced from the sample obtained in the similar manner, and the ASTM grain size was confirmed (Inventive Example). For comparison, the steel material A was used to prepare samples through a process of the steps S10 to S30 in the above embodiment, during which the heating temperature upon quenching in the step S30 was set to be lower than 900° C., and the samples were subjected to the similar tests (Comparative Example). The test results are shown in Table 3.

TABLE 3

| | 0.2% Proof Stress (MPa) | Tensile Strength (MPa) | Elongation (%) | Reduction of Area (%) | Impact Value (J/cm$^2$) | Grain Size (ASTM No.) |
|---|---|---|---|---|---|---|
| Inventive Example | 1202 | 1267 | 16 | 55 | 108 | 8-9 |
| Comparative Example | 1156 | 1257 | 14 | 38 | 59 | 8-9 |

Referring to Table 2, in the samples corresponding to the high hardness portion, in the case where the heating temperature upon quenching in the step S40 is set to be lower than 900° C., although preferable values are ensured for the 0.2% proof stress and the reduction of area, the tensile strength becomes insufficient (see Comparative Example). The tensile strength of 2058 MPa of the Comparative Example corresponds to the hardness of less than HRC 56. In contrast, in the case where the heating temperature upon quenching in the step S40 is set to be 900° C. or higher, a sufficient tensile strength of 2183 MPa can be obtained, and at the same time, excellent values have been ensured for the reduction of area and the 0.2% proof stress (see Inventive Example). Referring to Table 3, when comparing the Inventive Example and the Comparative Example in the samples corresponding to the low hardness portion, the values of the 0.2% proof stress and the reduction of area of the Inventive Example are considerably higher than those of the Comparative Example. Further, comparing the Inventive Example and the Comparative Example, despite their comparable grain sizes, the impact value of the Inventive Example is considerably higher than that of the Comparative Example. The above demonstrates that the tracked undercarriage component of the present application is excellent in durability.

(Experiments on Steel Structure)

Figure 6:
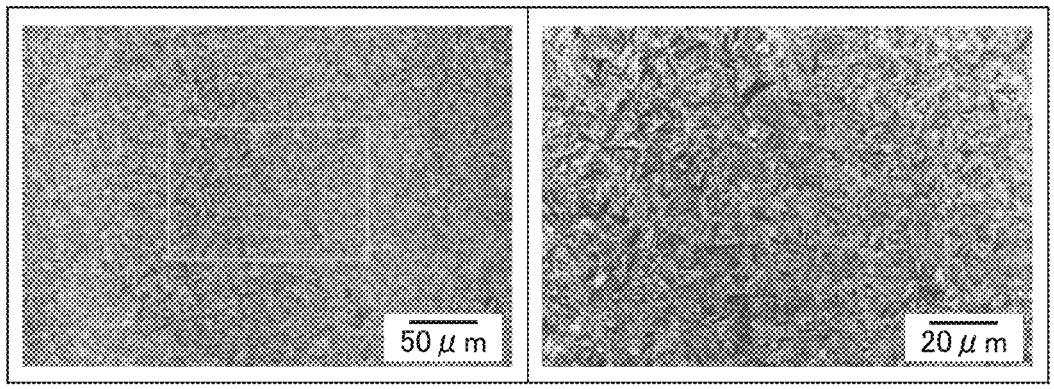
FIG. 6 shows optical micrographs of a microstructure of the steel constituting a high hardness portion.
Figure 7:
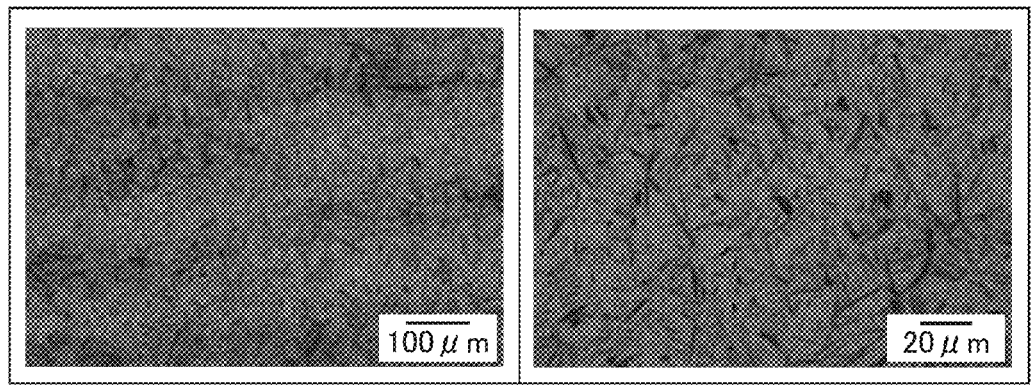
FIG. 7 shows optical micrographs of a microstructure of the steel constituting a low hardness portion.

A steel material in Table 1 was used to prepare a sample of a track link in a similar procedure as in the above embodiment. Test specimens were taken from the high hardness portion and the low hardness portion of the sample. The surfaces of the obtained test specimens were polished and then etched with a nitric acid alcohol solution, and the microstructures were observed using an optical microscope. FIG. 6 shows a microstructure of the steel constituting the high hardness portion. FIG. 7 shows a microstructure of the steel constituting the low hardness portion.

Referring to FIG. 6, it can be seen from the microstructure of the steel constituting the high hardness portion that the first matrix as the matrix of the high hardness portion includes a low temperature-tempered martensite phase. For the sample taken from the high hardness portion, the amount of residual austenite was measured using an X ray, and it was found that the residual austenite of 1 to 2 vol % was present. The above demonstrates that the first matrix constituting the high hardness portion includes the martensite phase and the residual austenite phase.

Referring to FIG. 7, it can be seen from the microstructure of the steel constituting the low hardness portion that the second matrix as the matrix of the low hardness portion includes a high temperature-tempered martensite phase.

Figure 8:
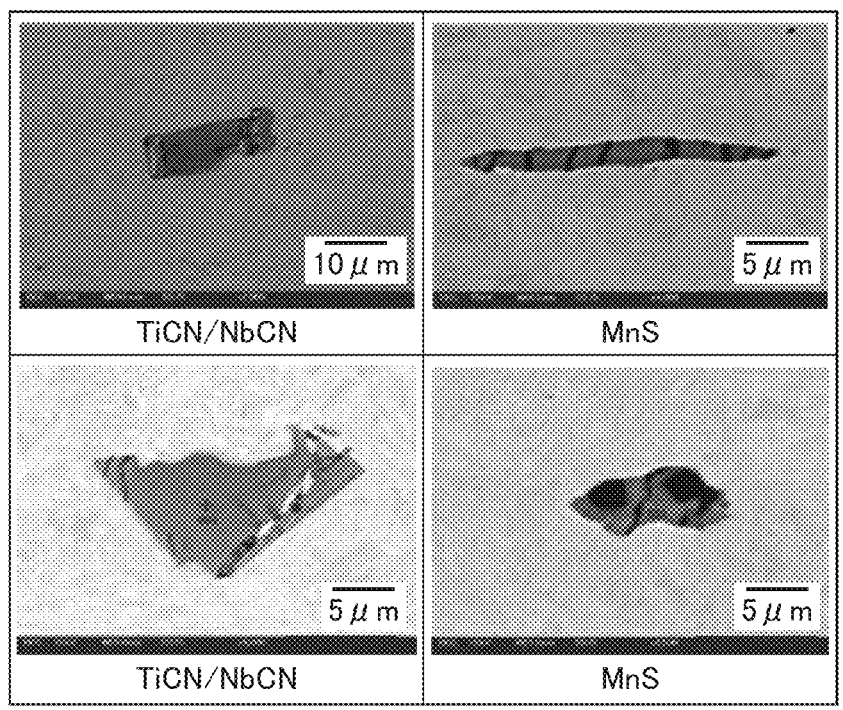
FIG. 8 shows SEM photographs of nonmetallic particles.

FIG. 8 shows photographs indicating the results of analysis by energy dispersive X-ray spectroscopy (EDX) of products that were found through observation of the high hardness portion and the low hardness portion with SEM. As shown in FIG. 8, it is confirmed that nonmetallic particles having a size of about 1 μm to 20 μm (first nonmetallic particles and second nonmetallic particles including at least one species selected from the group consisting of MnS, TiCN, and NbCN) are dispersed in the first matrix and the second matrix constituting the high hardness portion and the low hardness portion.

(Experiments on Carbides Formed at Grain Boundaries)

A steel material in Table 1 was used to prepare a test specimen (as forged; a sample A) which has undergone up to the step S20 in the above embodiment (with the forging temperature of 1250° C.), a test specimen (as quenched; a sample B) which has undergone up to the quenching treatment in the step S30 (with the heating temperature upon quenching of 870° C.), and a test specimen (as quenched; a sample C) which has undergone up to the quenching treatment in the step S30 (with the heating temperature upon quenching of 965° C.). For the samples A to C, the microstructures were observed with an optical microscope and SEM, and for products present along the grain boundaries, elemental mapping was conducted with EDX. The experimental results are shown in FIG. 9.

Figure 9:
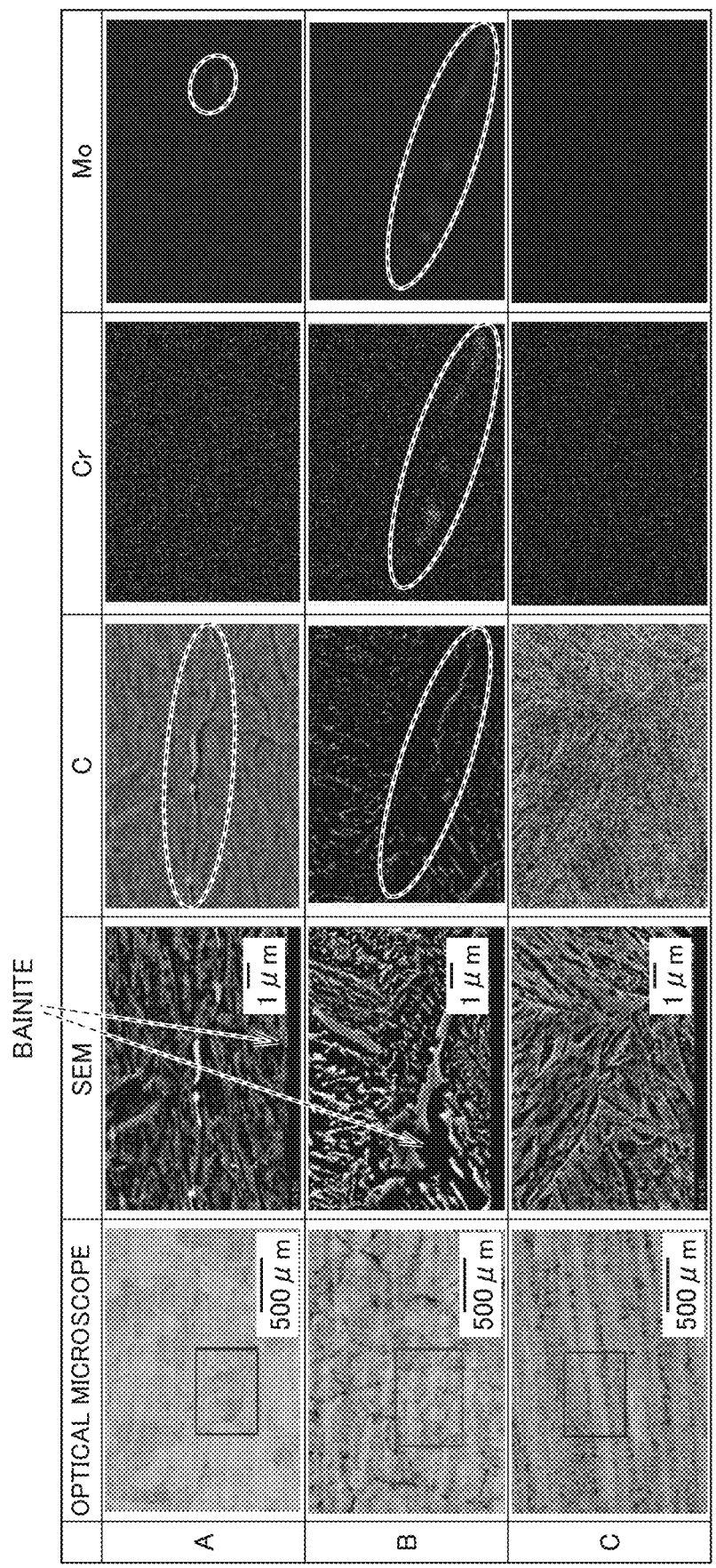
FIG. 9 shows observation results using an optical microscope and SEM, and elemental mapping results.

Referring to FIG. 9, it can be seen that a carbide of Mo and carbides of Mo and Cr are present along the grain boundaries in the sample A as forged and in the sample B as quenched, with the heating temperature upon quenching of 870° C. Further, bainite structures are formed around the carbides. The formation of the bainite structure is conceivably attributable to the local decrease in the amount of alloy elements because of the formation of the above carbides, and the resultant reduction in hardenability. In contrast, in the sample C as quenched, with the heating temperature upon quenching of 965° C., which corresponds to the tracked undercarriage component of the present invention, no carbides as described above were found. The above experimental results show that although the above-described carbides formed during the hot forging remain when the heating temperature upon quenching is set to be 870° C., the carbides dissolve and disappear when the heating temperature upon quenching is set to be 965° C.

Figure 10:
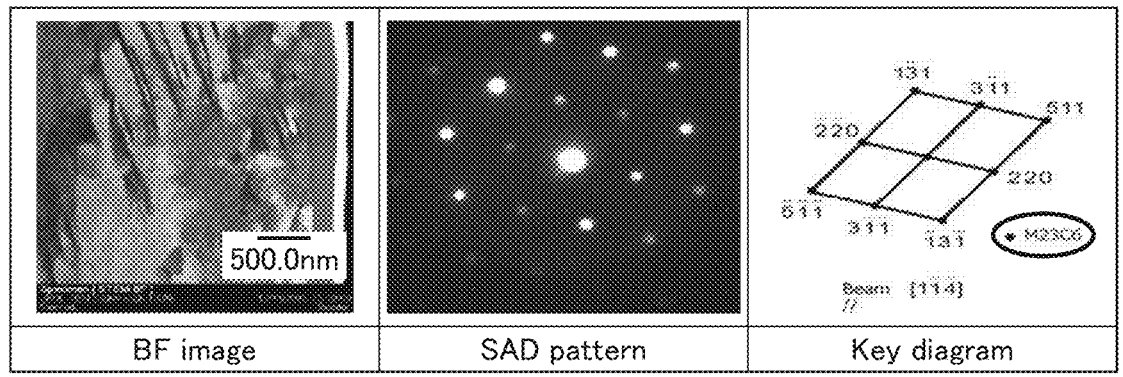
FIG. 10 shows a result of identification of a product present at a grain boundary.

An example of the identification of carbides present in the samples A and B is shown in FIG. 10, in which a carbide was detected in a bright-field image of STEM and then the selected area diffraction (SAD) pattern of the carbide was confirmed. As shown in FIG. 10, it can be seen that the carbide is a $M_{23}C_6$ carbide. That is to say, it has been confirmed that in the method of producing a tracked undercarriage component of the present application, the $M_{23}C_6$ carbides formed during the hot forging have disappeared by the heating during quenching in the step S30.

(Experiment on Relationship Between Heating Temperature and Reduction of Area)

A steel material in Table 1 was used to prepare test specimens which were quench-hardened by rapid cooling from various temperatures and then tempered at low temperature. The test specimens were subjected to a tensile test. At this time, the heating temperature upon quenching was varied to investigate the effect of the heating temperature on the reduction of area in the tensile test. The experimental results are shown in FIG. 11.

Figure 11:
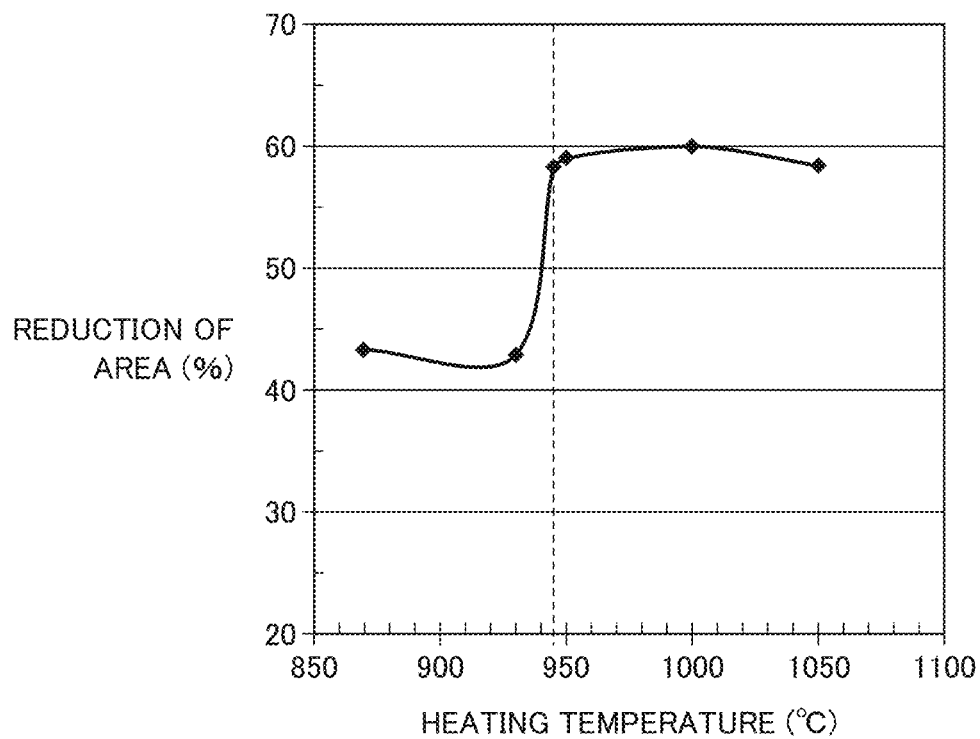
FIG. 11 shows a relationship between heating temperature and reduction of area.

Referring to FIG. 11, it can be seen that the reduction of area clearly increases with the heating temperature of 945° C. or higher. This temperature range of not lower than 945° C. agrees with the temperature range in which $M_{23}C_6$ carbides cease to be seen in the experiment on the carbides formed at the grain boundaries. This shows that it is possible to cause the $M_{23}C_6$ carbides generated at the grain boundaries of the steel to disappear by the heating to the temperature range of not lower than 945° C., and to improve the reduction of area.

While the track link was described as an example of the tracked undercarriage component of the present application in the above embodiment, the tracked undercarriage component of the present application is applicable to various tracked undercarriage components including a high hardness portion with a hardness of HRC 57 or more and HRC 60 or less in a part of the component, such as track bushings, track pins, sprocket teeth, track rollers, and carrier rollers.

It should be understood that the embodiment and examples disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: track travel device; 2: track; 3: track frame; 4: idler tumbler; 5: sprocket wheel; 6: track shoe; 7: outer link; 7A: high hardness portion; 7B: low hardness portion; 8: inner link; 8A: high hardness portion; 8B: low hardness portion; 9: track link; 10: track roller; 11: carrier roller; 51: sprocket tooth; 75: connecting pin hole; 76: boss; 77: rail surface; 79: track shoe securing surface; 85: bushing hole; 87: rail surface; 91: connecting pin; 91A: lubricant reservoir; 91B: lubricant passage; 89: track shoe securing surface; 91C: plug; 92: bushing; 92A: rotatable bushing; 92B: fixed bushing; 93: bolt; 94: nut; and 95: seal ring.

The invention claimed is:

1. A tracked undercarriage component made of a steel consisting of
   not less than 0.41 mass % and not more than 0.44 mass % C,
   not less than 0.2 mass % and not more than 0.5 mass % Si,
   not less than 0.2 mass % and not more than 1.5 mass % Mn,
   not less than 0.0005 mass % and not more than 0.0050 mass % S,
   not less than 0.6 mass % and not more than 2.0 mass % Ni,
   not less than 0.7 mass % and not more than 1.5 mass % Cr,
   not less than 0.1 mass % and not more than 0.6 mass % Mo,
   not less than 0.02 mass % and not more than 0.03 mass % Nb,
   not less than 0.015 mass % and not more than 0.03 mass % Ti,
   not less than 0.0005 mass % and not more than 0.0030 mass % B,
   not less than 20 mass ppm and not more than 60 mass ppm N, and
   optionally at least one species selected from the group consisting of
     not less than 0.05 mass % and not more than 0.20 mass % V,
     not less than 0.01 mass % and not more than 0.15 mass % Zr, and
     not less than 0.1 mass % and not more than 2.0 mass % Co,
   with the balance consisting of iron and unavoidable impurities,
   the tracked undercarriage component comprising:
     a high hardness portion having a hardness of HRC 57 or more and HRC 60 or less; and
     a low hardness portion constituting a region other than the high hardness portion and having a lower hardness than the high hardness portion;
     the high hardness portion including
       a first matrix including a martensite phase and a residual austenite phase, and
       first nonmetallic particles dispersed in the first matrix and including at least one species selected from the group consisting of MnS, TiCN, and NbCN,
     the high hardness portion not including a carbide represented as $M_{23}C_6$ (where M represents the metallic elements constituting the steel),
     the low hardness portion including
       a second matrix including a martensite phase, and
       second nonmetallic particles dispersed in the second matrix and including at least one species selected from the group consisting of MnS, TiCN, and NbCN,
     the low hardness portion not including a carbide represented as $M_{23}C_6$ (where M represents the metallic elements constituting the steel), and
     the high hardness portion having a Charpy impact value of 68 J/cm$^2$ or greater.

2. The tracked undercarriage component according to claim 1, wherein the steel contains at least one species selected from the group consisting of not less than 0.05 mass % and not more than 0.20 mass % V, not less than 0.01 mass % and not more than 0.15 mass % Zr, and not less than 0.1 mass % and not more than 2.0 mass % Co.

3. The tracked undercarriage component according to claim 2, wherein
the first matrix has a grain size number of 5 or more and 12 or less, and
the second matrix has a grain size number of 5 or more and 9 or less.

4. The tracked undercarriage component according to claim 2, wherein
the martensite phase constituting the first matrix is a low temperature-tempered martensite phase, and
the martensite phase constituting the second matrix is a high temperature-tempered martensite phase.

5. The tracked undercarriage component according to claim 3, wherein
the martensite phase constituting the first matrix is a low temperature-tempered martensite phase, and
the martensite phase constituting the second matrix is a high temperature-tempered martensite phase.

6. The tracked undercarriage component according to claim 1, wherein
the first matrix has a grain size number of 5 or more and 12 or less, and
the second matrix has a grain size number of 5 or more and 9 or less.

7. The tracked undercarriage component according to claim 6, wherein
the martensite phase constituting the first matrix is a low temperature-tempered martensite phase, and
the martensite phase constituting the second matrix is a high temperature-tempered martensite phase.

8. The tracked undercarriage component according to claim 1, wherein
the martensite phase constituting the first matrix is a low temperature-tempered martensite phase, and
the martensite phase constituting the second matrix is a high temperature-tempered martensite phase.

9. A method for producing a tracked undercarriage component, comprising the steps of:
preparing a steel material made of a steel consisting of:
not less than 0.41 mass % and not more than 0.44 mass % C,
not less than 0.2 mass % and not more than 0.5 mass % Si,
not less than 0.2 mass % and not more than 1.5 mass % Mn,
not less than 0.0005 mass % and not more than 0.0050 mass % S,
not less than 0.6 mass % and not more than 2.0 mass % Ni,
not less than 0.7 mass % and not more than 1.5 mass % Cr,
not less than 0.1 mass % and not more than 0.6 mass % Mo,
not less than 0.02 mass % and not more than 0.03 mass % Nb,
not less than 0.015 mass % and not more than 0.03 mass % Ti,
not less than 0.0005 mass % and not more than 0.0030 mass % B,
not less than 20 mass ppm and not more than 60 mass ppm N, and
optionally at least one species selected from the group consisting of
not less than 0.05 mass % and not more than 0.20 mass % V,
not less than 0.01 mass % and not more than 0.15 mass % Zr, and
not less than 0.1 mass % and not more than 2.0 mass % Co with the balance consisting of iron and unavoidable impurities;
hot forging the steel material to obtain a formed body;
performing quenching treatment on an entirety of the formed body by cooling the formed body from a temperature not lower than 945° C. and not higher than 1050° C. to a temperature not higher than the $M_s$ point of the steel and, thereafter, performing high temperature tempering treatment on the entirety of the formed body by heating the formed body to a temperature not lower than 570° C. and not higher than 620° C.; and
forming a high hardness portion within the formed body by partially cooling the formed body having undergone the high temperature tempering treatment from a temperature not lower than 900° C. to a temperature not higher than the $M_s$ point of the steel and, thereafter, adjusting a hardness of the high hardness portion to be HRC 57 or more and HRC 60 or less by heating the high hardness portion to a temperature not lower than 150° C. and not higher than 200° C.

10. The tracked undercarriage component producing method according to claim 9, wherein the steel further contains at least one species selected from the group consisting of not less than 0.05 mass % and not more than 0.20 mass % V, not less than 0.01 mass % and not more than 0.15 mass % Zr, and not less than 0.1 mass % and not more than 2.0 mass % Co.

* * * * *